May 15, 1962 R. DRESSLER ET AL 3,034,723

ELECTRIC ANALOGUE CIRCUIT AND METHOD

Filed May 15, 1958 4 Sheets-Sheet 1

*INVENTORS*
ROBERT DRESSLER
ALBERT B. JACOBS

BY
Pennie Edmonds Morton Barrows & Taylor
ATTORNEYS

ELECTRIC ANALOGUE CIRCUIT AND METHOD

Filed May 15, 1958

4 Sheets-Sheet 2

INVENTORS
ROBERT DRESSLER
ALBERT B. JACOBS

BY
Pennie Edmonds Morton Barrows & Taylor
ATTORNEYS

INVENTORS
ROBERT DRESSLER
ALBERT B. JACOBS
BY
Pennie Edmonds Morton Barrows & Taylor
ATTORNEYS May 15, 1962 R. DRESSLER ET AL 3,034,723

ELECTRIC ANALOGUE CIRCUIT AND METHOD

Filed May 15, 1958 4 Sheets-Sheet 4

INVENTORS
ROBERT DRESSLER
ALBERT B. JACOBS
BY
Pennie, Edmonds, Morton, Barrows & Taylor
ATTORNEYS 3,034,723
Patented May 15, 1962

3,034,723

ELECTRIC ANALOGUE CIRCUIT AND METHOD

Robert Dressler and Albert B. Jacobs, Elmont, N.Y., assignors to Autometric Corporation, New York, N.Y., a corporation of Delaware Filed May 15, 1958, Ser. No. 735,466
15 Claims. (Cl. 235—184)

The present invention relates to mapping and to the determination of the location of landmarks, and more particularly to the minimization of errors accumulating in a mapping procedure. The present invention provides a method and means whereby the closure errors appearing in a plot of multiple partially overlapping topographical photographs are used to produce an optimum fit of the overlapping photographs to each other.

If there are taken, for example from an aircraft, and all to the same scale, partially overlapping topographical photographs of an area, the photographs may be assembled by superposing them in their overlapping portions to form a composite photograph of the entire area. The relative positions of the individual photographs may then be specified, with respect to a known landmark appearing on one of them, in terms of two geographical coordinates of a point similarly located in each of the successive photographs, e.g. the centers thereof.

It will in general be found however that the algebraic sum of the displacements measured along either of these coordinates, taken singly, through the centers of a number of such photographs forming a closed path such as a circle or a square, will not be equal to zero. The departure of this sum from zero may be regarded as a closure error. The invention effects, for each coordinate, an optimum distribution of this closure error among all the displacements of the closed path and hence gives an optimum relative positioning of the photographs making up that path. The invention also permits such redistribution of the multiple closure errors found upon traversing a plurality of closed loop paths so made up that each pair of adjacent loops includes two or more overlapping photographs in common. In accordance with the invention these plural closed loops are selected to cover the complete area to be mapped, so that the invention permits generation of corrected coordinates for the centers, or other selected points, in all photographs of the set. The invention additionally permits introduction into the corrections to be made of the effect of additional landmarks of independently known positions found within the area embraced by the photographs. The invention also permits estimation of the effect of uncertainty in the known positions of those landmarks. The invention also permits the weighting of various measurements to allow the redistribution of points from measurements of different accuracies.

The invention will now be described with further reference to the accompanying drawings, in which.

Figure 1:
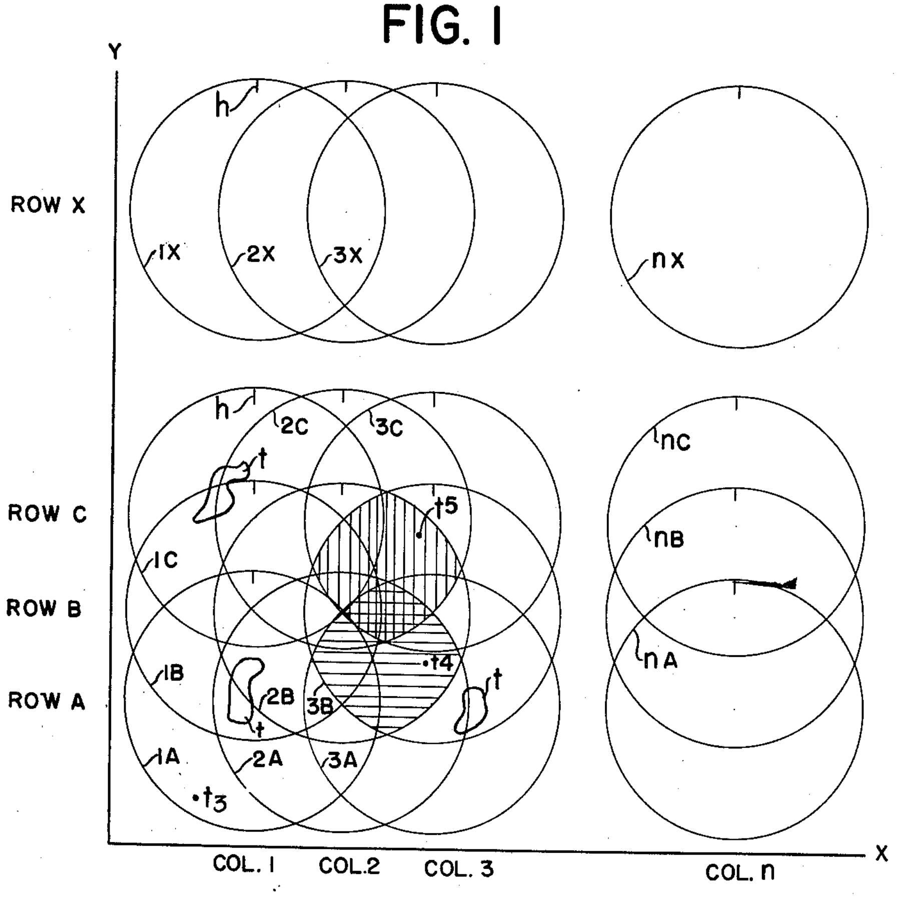
FIG. 1 is a diagram indicating the doubly overlapping nature of a set of topographical photographs whose relative positions, and that of the landmarks shown therein, is to be determined to maximum accuracy in accordance with the invention.
Figures 3, 4, 5, 6:
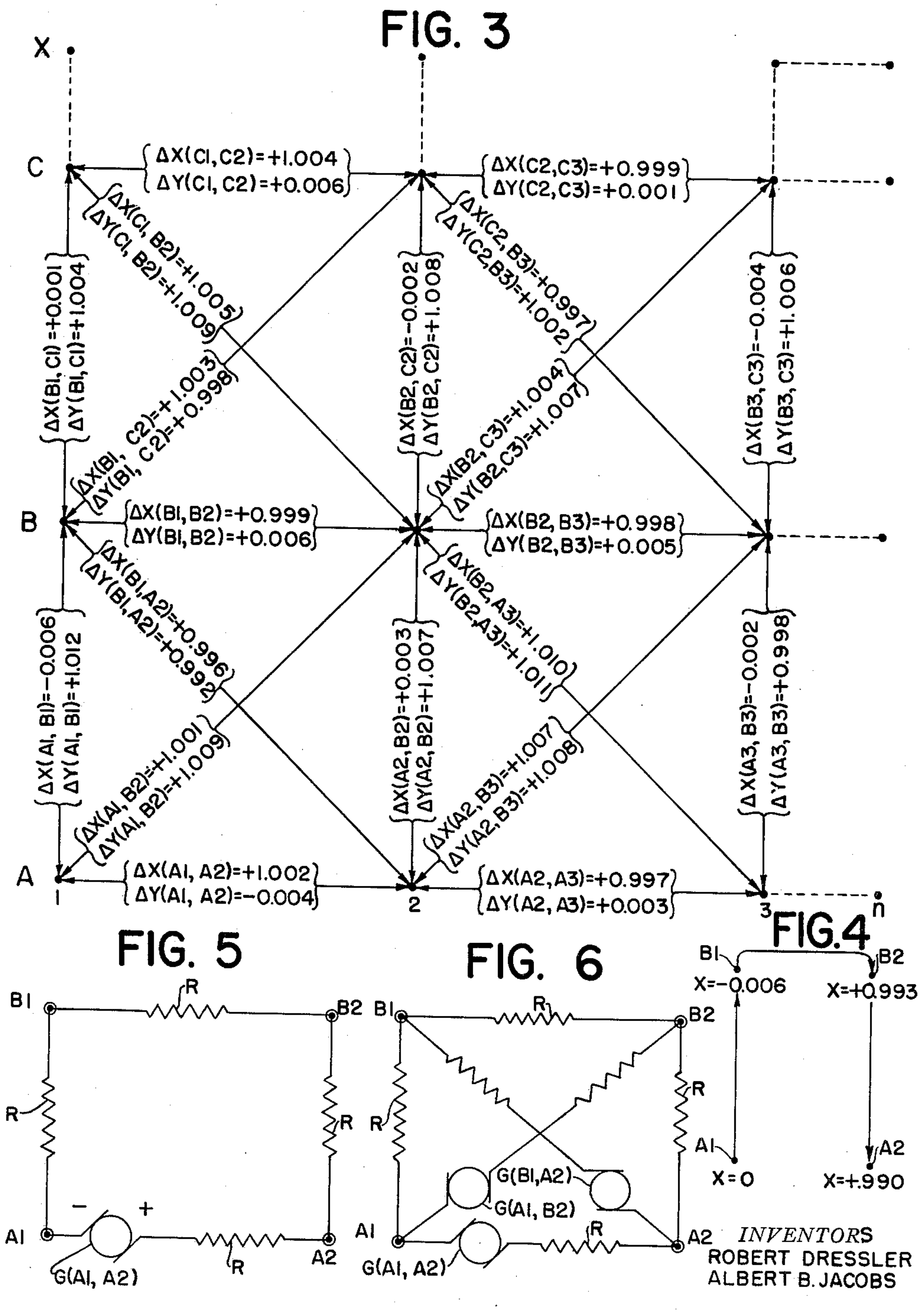
FIG. 3 is a diagram indicating the measured data obtainable from the photographs of FIG. 1, which data is to be operated on in accordance with the invention for minimization of the errors therein.
Figure 7:
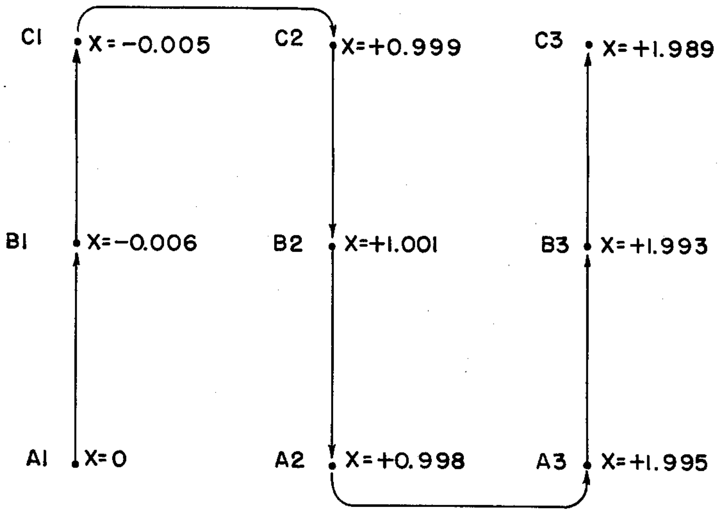
Figure 8:
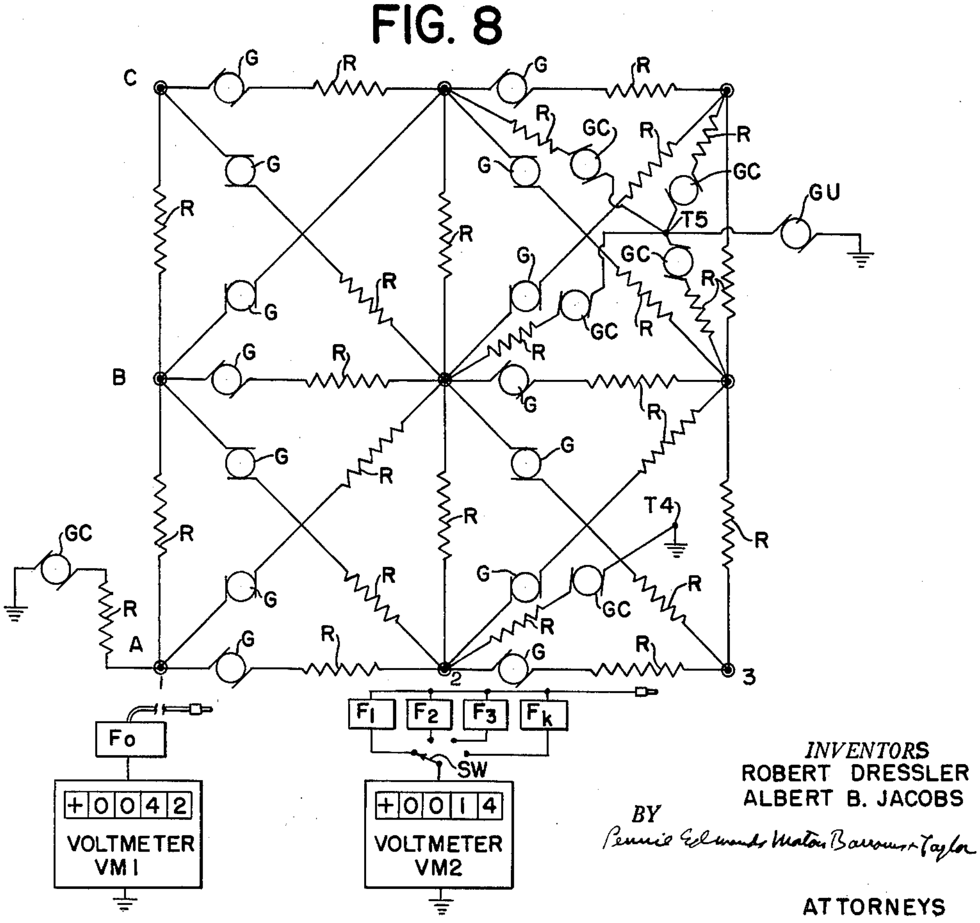
Figure 9:
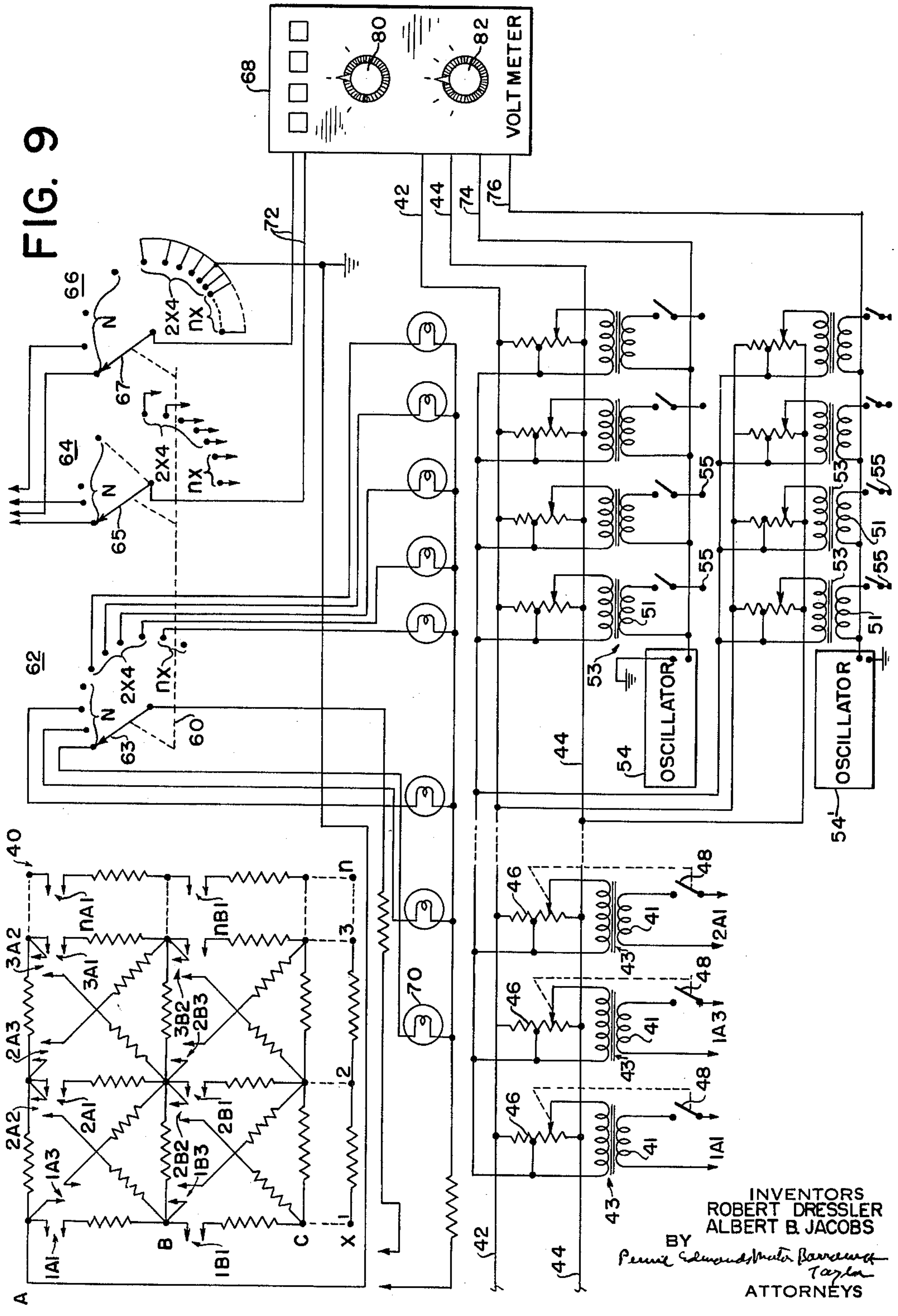

FIG. 4 is a diagram similar to that of FIG. 3 but indicating, for a single one of the two linear coordinates in terms of which the relative position of the photographs of FIG. 1 are measured and for the four photographs which are simultaneously in rows A and B and in columns 1 and 2 of FIG. 1, the positions of the centers of those photographs according to an arbitrarily selected route for accumulation of the displacements between those photographs successively;

FIG. 5 is a schematic diagram of one form of electric analogue circuit according to the invention for obtaining the relaxed coordinates, with respect to each other, of the four photographs for which data are given in FIG. 4;

FIG. 6 is a schematic diagram of a more complete electric analogue circuit according to the invention for obtaining with improved accuracy the relaxed coordinates, with respect to each other, of the four photographs for which data are given in FIG. 4;

FIG. 7 is a diagram similar to that of FIG. 4 but giving, for the $x$-coordinate, assumed values for nine photographs of FIG. 1 in rows A, B, C and columns 1, 2 and 3 thereof, again according to an arbitrarily selected route for accumulation of the measured data of FIG. 3;

FIG. 8 is a schematic diagram of an electric analogue apparatus according to the invention suitable to obtain relaxed values of the coordinates of the nine points of FIG. 7; and FIG. 9 is a schematic diagram of another form of electric analogue apparatus according to the invention.

In accordance with the present invention, there is prepared a set of aerial photographs covering a substantial area, the photographs being obtained from a series of aircraft flights. The photographs are taken in such succession that they overlap each other to a very substantial extent. Typically the complete set of photographs may cover an area which may, for example, extend 600 or 1,000 miles north and south and 200 or more miles east and west. One succession of photographs is obtained, for example, in the course of a northerly flight departing from an east-west base line. A second succession of photographs, partly overlapping the first, is then obtained in the course of a second northerly flight departing from the same base line, and so on, until the entire area has been covered. The frequency of the photographic exposures in the course of each northerly flight and the east-west separation of successive flights are so adjusted that, except as to photographs about the edge of the entire rectangular area, a desired fraction of the area contained within any one photograph, which may amount to some 60%, is also contained within each of the adjacent photographs to the north and south thereof and within each of the adjacent photographs to the east and west thereof.

The photographs may be directly taken from light images of the earth's surface recorded on photosensitive films or plates by a camera in the aircraft, or they may be photographs of radar or similar images. Thus the photographs may constitute recordings of radar displays of the type which produce a two-dimensional or pictorial representation of the target area scanned by the radar. The so-called PPI or plan position indicator radar displays are an example of this type of display in which there appears on the fluorescent screen of the radar receiver, as flown in an aircraft, a pictorial representation of a circular area of the earth's surface. Corrections can be introduced electrically into the radar equipment to compensate for such peculiarities of radar mapping as slant range, shear distortion and the like.

In FIG. 1, irregularly-shaped topographical features of an area of the earth as they appear on the cathode-ray tube screen of a radar receiver having PPI display are indicated in outline at the closed lines $t$. With respect to the shape and relative positioning of the closed lines $t$, FIG. 1 is hence a topographical map of a portion of the earth's surface of minimum detail to which certain additional indicia have been applied. These indicia comprise a plurality of circles which are arranged in a plurality of rows identified by letters A, B, C . . . X, and, in a plurality of columns identified by numbers 1, 2, 3 . . . $n$. The circles in column 1 are labeled 1A, 1B, 1C . . . 1X while those in column 2 are labeled 2A, 2B, 2C . . . 2X, and so on. Each of the circles, with particular reference to the targets $t$ appearing therein, is a representation of an aerial photograph or of a PPI radar screen in an aircraft when located above the earth's surface at the center of the corresponding circle. The circles of each column may represent the successive photographs taken in the course of a single flight, or the mapping flights may of course be in the perpendicular direction of the rows. At the edge of each of the circles of FIG. 1 a short radial line $h$ indicates the heading of the aircraft at the time of the photographic exposure of that circle.

Due to variations in the speed of the aircraft, and to other navigational irregularities, the photographs identified by the circles of FIG. 1, and those circles themselves therefore will not in general be disposed in a perfectly rectangular array. All however present portions of the earth's surface to the same linear scale, variations in absolute aircraft altitude, if any, being compensated for in the photographic process.

If photographic prints corresponding to each of the circles 1A, 1B, 1C . . . 1X, 2A, 2B, 2C . . . 2X . . . $n$A, $n$B, $n$C . . . $n$X, are prepared on transparent film, the relative position of each of these photographs to each of its partly overlapping neighbors in FIG. 1 can be determined by superposing, either physically or optically, the common portions of each such pair of overlapping photographs and effecting relative movement thereof for optimum match. The relative position of each pair of photographs can be completely specified in terms of three coordinates $x$, $y$ and $\theta$. $x$ and $y$ are linear coordinates, conveniently orthogonal, and the values thereof are measured to corresponding points in the two photographs or "frames," e.g. the centers thereof. $\theta$ is an angular coordinate measuring the rotation of one frame with respect to the other. Provided the radar and/or photographic apparatus is fixed in the aircraft throughout the taking of all photographs, the rotation between successive frames is equal to the angular inclination to each other of the heading or lubber lines $h$. The coordinates $x$, $y$ and $\theta$ may have negative as well as positive values.

The coordinates $x$ and $y$ are advantageously selected to represent a pair of perpendicular geographical coordinates such as easterly and northerly departures from a reference point fixed with respect to the first photograph of the set, the members of which are to be matched together in pairs. The direction of $x$ and $y$ with reference to the earth must be preserved unchanged throughout all "matches" which are to be used together (each match referring to a set of $x$, $y$ and $\theta$ values). In order to preserve the same geographical significance for the relative linear displacements $x$ and $y$ between each pair of photographs to be matched, the net algebraic accumulated value of $\theta$ up to each photograph with respect to which the position of the next photograph in a series is to be measured must be inserted as an angular position for such next-to-last photograph, by reference to the $x$ and $y$ directions of measurement, before the $x$ and $y$ values for the match being made are taken.

In the copending application Ser. No. 621,844, now Patent No. 2,989,890, assigned to the assignee hereof, there is disclosed a method and apparatus for obtaining in an organized, efficient and rapid manner the $x$, $y$ and $\theta$ values which specify the positional relation of each pair of overlapping photographs.

It is to be noted that $x$, $y$ and indeed $\theta$ values may be taken or measured not only with respect to each pair of successive photographs in a series of photographs chronologically taken during a single survey flight, but also between successive photographs in a horizontal row (referring to FIG. 1) even though the survey flights were made in the direction corresponding to the columns of that figure. Moreover, $x$ and $y$ values can be taken, and for the purpose of the present invention preferably are taken, for pairs of adjacent photographs disposed along the diagonals and other cross members of the array or matrix of photographs arranged in rows and columns in FIG. 1.

Figure 2:
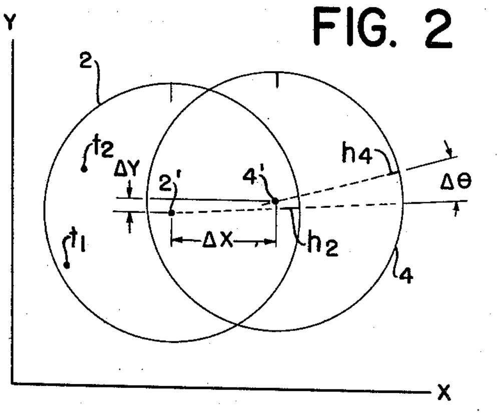
FIG. 2 is a diagram showing the relative position of two adjacent photographs in FIG. 1.

FIG. 1 shows the coordinate axes $x$ and $y$ along which are resolved the separations of the centers of the adjacent photographs in the matching process. For clarity, however, FIG. 2 illustrates a single pair of adjacent photographs 2 and 4, with centers 2′ and 4′, superposed to effect a match of the subject matter appearing in their common portions. The photographs are shown positioned with respect to $x$ and $y$ coordinate axes, the $y$ axis representing north-south and the $x$ axis representing east-west directions respectively. In photograph 2, target $t_1$ and $t_2$ are known to define by the line between them a specified true direction, with respect to which the $y$ and $x$ axes have been positioned to be directed north and east as above stated. Moreover target $t_1$ is a landmark of known latitude and longitude.

From a knowledge of the linear scale of the photographs and from measurements of the differences in $x$ and $y$ coordinates between point 2′ and point $t_1$, the geographical coordinates of point 2′ may be found, either in latitude and longitude or in some other grid which may be available for the region photographed. The data relating the two photographs represented by the circles 2 and 4 may be referred to for short as a "match," and comprises the separations $\Delta x$ and $\Delta y$ of 2′ and 4′ along the $x$ and $y$ directions and the change in $\theta$ given by the inclination of the lubber line $h_4$ with respect to the lubber line $h_2$, the true direction of the line $h_2$ being known so that the true direction of $h_4$ is known also (for lubber line stabilized photographs). For north stabilized photographs, the change in $\theta$ is indicative of the error of the stabilization.

The $\theta$ values are of importance in producing an actual map or chart of a composite photograph from the photographs whose relative positions are indicated at the circles in FIG. 1. They are also of value in determining the separations, along the fixed $x$ and $y$ directions, from the centers of the photographs on which they appear, of landmarks of known position. The positions of such landmarks may be known from ground surveys, astronomical observations, or the like. Such landmarks may be referred to as "check points" and are useful in the invention, and will be further discussed hereinafter.

However, for the correction according to the invention of the measured data on the relative positions of the photographs without the use of such check points, it is the linear measurements in $x$ and $y$ obtained from the matching procedure above outlined which are of interest. Assumed values for these measured data are indicated in FIG. 3 for the mutual spacings of nine photographs 1A, 2A, 3A, 1B, 2B, 3B, 1C, 2C, 3C, forming neighbors in adjacent rows and columns of the array of FIG. 1. Due to errors in navigation, irregularity in air speed of the aircraft and inequality in the intervals at which the photographs are taken, the successive photographs represented by the circles of FIG. 1 will not in general lie in a perfectly rectangular array; and it is not a necessary condition of the invention that they should lie in such an array. The photographs are however advantageously taken to lie as nearly in such a rectangular array as convenient.

Consequently, in the diagram of FIG. 3, a plurality $n$X of photographs is indicated by means of $n$X points disposed in a square array. Each point may be considered as representing the center of the photograph of FIG. 1, whose designation it carries. The array comprises $n$ columns 1, 2, 3 . . . $n$ and X rows A, B, C . . . X, according to which each point may be identified as A1, B2, C2, etc. Between each pair of adjacent points in FIG. 3, there are indicated the measured change in $x$, labeled $\Delta x$, and the measured change in $y$, $\Delta y$, measured along $x$ and $y$ coordinate axes. These are, in the example illustrated, roughly parallel, respectively, to the rows and columns of the array of photographs of FIG. 1.

Between successive points in each row, the changes $\Delta x$ are substantial and all of the same general order of size, being substantially equal to the separation of successive north-south mapping flights if the photographs were taken by a succession of such flights. In instead the photographs were taken in a succession of east-west flights, the separations $\Delta x$ between successive points in any row amount substantially to the distances over the ground made by the aircraft between successive photographic exposures. The changes $\Delta y$ in $y$ between successive points along the rows are in contrast very small, comprising small values on either side of zero. Conversely, the changes $\Delta y$ are large along the columns whereas the changes $\Delta x$ are small along the columns. The values of $\Delta x$ and $\Delta y$ may conveniently be given in the actual linear measure of the photographs, for example in centimeters, which have a known scale value in miles or kilometers or other units of linear measure over the earth's surface. In an actual case, the separation of the centers of adjacent photographs along the columns or rows might be of the order of ten miles.

It will be noted that the table of FIG. 3 includes for each of the two diagonals of each elementary square of the array both $\Delta x$ and $\Delta y$ values, and that these are all of the order of magnitude of the $\Delta x$ values along the rows of the $\Delta y$ values along the columns. It must be understood that the values entered in FIG. 3 along the diagonals do not represent the diagonal distance between the centers of two photographs at diagonally opposite corners of a quadrangle of partially overlapping photographs. Instead they represent the components of those distances along the $x$ and $y$ axes.

It is also to be noted that the $\Delta x$ and $\Delta y$ values entered in FIG. 3 are followed in parentheses by the row and column designations of two points in the array of that figure, identifying respectively the starting point and end point of the measurement in each case. These designations accordingly attribute a sense to the recorded values of $\Delta x$ and $\Delta y$. Thus, $\Delta x\ (Xn, Yn) = -\Delta x(Yn, Xn)$. In addition, the $\Delta x$ and $\Delta y$ values themselves have signs, positive or negative. The sign of a $\Delta x$ change is positive if in going from a point in a column of lower order to a point in a column of higher order the accumulated $x$ coordinate increases algebraically, and vice versa. Similarly the sign of a $\Delta y$ change is positive if, in going from a point in a row of lower order to a point in a row of higher order the accumulated $y$ coordinate increases algebraically.

Although not essential to an understanding of the present invention, it may be observed that the algebraic sign of the change in accumulated $x$ or $y$ coordinates for any match is automatically obtained when the matches are made with the apparatus disclosed in the copending application already referred to, inasmuch as in that apparatus the change in $x$ and $y$ coordinates in going from one photograph to another appears as an increase or decrease in a dial setting.

The data of FIG. 3 necessarily include errors. These derive in part from the photographic equipment with which the photographs are taken (including the radar apparatus, if any) and also from the photograph printing apparatus. They also contain errors due to the apparatus employed in making and reading the matches between adjacent photographs, and further errors due to the operators thereof. These errors are manifested in the lack of closure which in the general case will appear upon traversing any closed path in the array of FIG. 3, the closed path being executed in terms of a single one of the coordinates $x$ and $y$. Thus to take the simplest example, the algebraic sum of the changes $\Delta y$ in traversing the closed path from point A1 to point B1 to point B2 to point A2 and back to point A1 will in general not be zero.

The invention provides a method and means for distributing these closure errors among the measured coordinates of the photographs, i.e. among the coordinates of the points diagrammatically illustrated in FIG. 3. According to the invention, the measured values for the spacings of the points are accumulated (from a point which may be regarded as an origin and according to an arbitrarily selected route among the points) to assign to each point, and separately for each coordinate, what may be termed an "assumed" value for the coordinate of that point. (The "assumed" values could also be determined from any other source of data such as charts, navigational information etc.; however, this would then require the determination of closure errors along every path of measurement.) A series of closed paths is then traced out among the points by means of these assumed values, and the closure error in each such closed path is determined. The invention then provides an electric analogue of the closed path or paths wherein there is introduced, into each closed path, a generator proportioned to the closure error determined for that path.

In each closed path analogue circuit the voltage generator alters from zero to (typically) some non-zero value the voltage difference between each pair of points in the analogue circuit. The alteration occurs in accordance with a least squares relaxed fit such that the voltage difference between each pair of points is, according to a common scale for all pairs of points in the analogue circuit, a measure of the relaxed error in the separation of the points of that pair, along the coordinate axis under representation, as that separation is given from the "assumed" values of that coordinate for the two points of the pair.

As will be presently explained, even four points, in two rows and two columns, give rise to three closed paths, and the complete analogue network for such four points includes three error voltage generators. When the coordinates of a larger number of points are to be relaxed, the number of error voltage generators increases accordingly.

The error voltage generators in the analogue network, whether two or more in number, coact to alter, with respect to a reference point in the analogue circuit, for example that corresponding to the point of origin, in FIG. 3, from which the spacings are accumulated, the voltage at every other point in the analogue circuit corresponding to one of the points of FIG. 3. The alteration occurs in accordance with a least squares relaxed fit such that the voltage between each point in the analogue circuit and the reference point therein is a measure of the relaxed error in the assumed value, for the coordinate under consideration, of the corresponding point in FIGS. 1 and 3.

This can be understood most easily by reference to FIGS. 4 and 5. In FIG. 4 the centers of the four photographs 1A, 1B, 2B and 2A of FIG. 1 are shown at four points A1, B1, B2 and A2, and adjacent each of these points is indicated the accumulated $x$-coordinate thereof assumed by traversing the points A1, B1, B2 and A2 in that order, point A1 being further assumed to have an $x$-coordinate of zero.

It will be noted that since in FIG. 3, $\Delta x(A1, B1)$ is negative in sign and of value 0.006, and since the selected path in FIG. 4 is from A1 to B1, the accumulated $x$-coordinate for point B1 in FIG. 4 is $-0.006$. Since $$\Delta x(B1, B2)$$

is positive in sign and of value 0.999, and since the selected path in FIG. 4 is from B1 to B2, the accumulated $x$-coordinate for point B2 in FIG. 4 is $$-0.006+0.999=+0.993$$

Further, since in FIG. 3 $\Delta x(A2, B2)$ is positive in sign and of value 0.003, and since the path assumed in FIG. 4 is from B2 to A2, the accumulated $x$-coordinate for point A2 in FIG. 4 is $+0.993-0.003=+0.990$.

FIG. 5 shows the electric analogue, according to the invention, for obtaining the relaxed $x$-coordinates of the centers of the four photographs 1A, 1B, 2B, 2A for which data are given in FIG. 4.

It is to be remembered that for the moment it is only the photographs 1A, 1B, 2B and 2A which are of interest, and that the center of photograph 1A is assumed to be at the origin of $x$-coordinates. FIG. 4 then shows the accumulated $x$-coordinate values for the centers of photographs 1B, 2B and 2A, based upon the measured data shown in FIG. 3 and for the path A1, B1, B2, A2.

Since the difference between the accumulated $x$-coordinate value $+0.990$ found for point A2 in FIG. 4 and the $x$-coordinate of point A1 is unequal to the measured separation $\Delta x(A1, A2)$ given in FIG. 3 for points A1 and A2, a closure error exists, and the $x$-coordinate values of the four points may be improved in accordance with the invention by redistributing this error among the four spacings which characterize the four photographs and on which spacings measured data are available. This redistribution is effected according to the principle of least squares by means of the electric analogue of FIG. 5.

The analogue network of FIG. 5 comprises four electrical junction points, identified as A1, B1, B2 and A2, interconnected with four resistors R, all of the same value. The resistors need not be identically of the same value, the errors introduced by inequalities among them being errors of errors only, inasmuch as the voltages which are to be introduced into the network of FIG. 5 are representative of errors in linear coordinates, and not representative of the linear coordinates themselves.

To relax the $x$-coordinates of the points A1, B1, B2, A2 in respect of the closure error found in the loop path traced through the points A1, B1, B2, A2 successively, there is introduced into the branch of the network of FIG. 5 joining points A1 and A2 in that network a generator $G(A1, A2)$ the magnitude and polarity of whose voltage are given by the relation.

$$G(\overset{-}{A2}, \overset{+}{A1})K=x(A2)-x(A1)+\Delta x(A2, A1) \quad (1)$$

wherein $x(A2)$ and $x(A1)$ are the accumulated $x$-coordinate values assumed (shown in FIG. 4) for the points A2 and A1 respectively with the selected path from A1 to B1 to B2 to A2, and wherein $\Delta x(A2, A1)$ is the change in $x$ between points A2 and A1, measured in the sense from point A2 to point A1. In Equation 1, K is a factor of proportionality relating linear measure, on the right hand side of the equation, with potential measure on the left.

Hence (the assumed $x$-coordinate of point A1 being zero):

$$G(\overset{-}{A2}, \overset{+}{A1})K=+0.990-1.002=-0.012 \quad (2)$$

This last equation states that the generator $G(\overset{-}{A2}, \overset{+}{A1})$ must develop a voltage of amplitude $0.012/K$ volts, and that it must be poled with its positive pole toward the junction A2, the convention adopted in the notation $G(\overset{-}{A2}, \overset{+}{A1})$ being that a positive value for the voltage requires that the positive pole of the generator be connected adjacent the junction A1.

More generally, the value of the closure error voltage generator $G(\overset{-}{m}, \overset{+}{n})$ to be inserted between two matrix junction points $m$ and $n$ of an analogue network, according to FIGS. 6, 8 or 9, the assumed $x$-coordinates of those points being $x(m)$ and $x(n)$ respectively (in consequence of an accumulation of $x$-coordinates from an origin and passing by an arbitrarily selected path through the points $m$ and $n$) is given by the relation $$G(\overset{-}{m}, \overset{+}{n})K=x(m)-x(n)+\Delta x(m, n) \quad (3)$$

wherein $\Delta x(m, n)$ is the change in $x$ between points $m$ and $n$, measured from point $m$ to point $n$, and wherein K is a selected constant of proportionality. If the equation is positive in value, the "positive" terminal of the voltage is to be connected toward the junction point $n$.

The generator may be of either direct current or of alternating current voltage. If, in the case of the generator of FIG. 5 according to Equation 2, it is of direct current voltage, its introduction into the four-branch net of FIG. 5 will change the direct current voltage of each of the junctions B1, B2 and A2 with respect to that of the reference junction A1 from zero to some positive value, and these voltages will, according to the common factor of proportionality K, be a measure of the changes to be made in the assumed values of $x$-coordinate for the points B1, B2 and A2 in order to obtain relaxed values of those $x$-coordinate values.

For example, the factor K might be $10^{-3}$ cm./volt so that the voltage called for by the symbol $G(\overset{-}{A2}, \overset{+}{A1})$ in Equation 1 would include one volt for every thousandth of a unit of linear measure, assumed to be in centimeters, on the right side of the equation. The correction to be applied to the assumed $x$-coordinate value of each of the points A2, B2 and B1 is then obtained by multiplying by $10^{-3}$ cm./volt the voltage measured between each of those points in FIG. 5 and the point A1 in FIG. 5. The corrections thus obtained are then algebraically added to the assumed values in order to obtain the least square adjusted position of each point with respect to A1.

Alternating current voltage generators are however much more convenient to use, and may be used by the provision of a reference phase, e.g. of a single phase A.C. generator of the same frequency as that of the generators to be inserted into the analogue network and having one terminal connected to the reference junction A1 (typically grounded). The reference generator is then defined as "positive," and the closure error voltages are introduced into the analogue network by means of generators cophasal with the reference voltage, the terminal of the error voltage generator in phase with the free terminal of the reference voltage being connected toward the matrix junction toward which the "positive" pole of the closure error voltage must be connected in accordance with the sign of the left hand side of Equation 1 and the conventions above set forth. Thus in the example just given with respect to FIG. 5, if an A.C. generator is used for the voltage $G(\overset{-}{A2}, \overset{+}{A1})$ such a generator would be introduced in the branch connecting junctions A1 and A2 in FIG. 5 with the terminal of that generator in phase with the reference generator adjacent junction A2.

With the set of assumed $x$-coordinate values for the points A1, B1, B2, A2 shown in FIG. 4, two other closure errors can be found with the data in FIG. 3 on the measured diagonal separations of points A1, B2 and of points B1, A2, and two additional error generators can be introduced into an improved analogue circuit for points A1, B1, B2 and A2 shown in FIG. 6, to obtain a further and improved, relaxed fit of the $x$-coordinates of those points.

In FIG. 6, the four electrical junctions A1, B1, B2 and A2 are interconnected along rows and columns by resistors R, as in FIG. 5, and additionally along the diagonals of the array made up by those junctions, again by means of resistors R. The circuit of FIG. 6 includes in branch A1, A2 a generator $G(A1, A2)$ energized with a voltage $G(\overset{-}{A2}, \overset{+}{A1})$ dimensioned and poled exactly as in the embodiment of FIG. 5. The circuit of FIG. 6 includes additional error voltage generators $G(A1, B2)$ and $G(B1, A2)$ in the branches A1, B2 and B1, A2 respectively.

For the three-sided loop joining points A1, B1, A2 in FIG. 6 to the magnitude of the desired voltage can immediately be written from Equation 3 and from the data of FIGS. 3 and 4 thus:

$$G(\overset{-}{B}1, \overset{+}{A}2)K=-0.006-0.990+0.996=0$$

Hence the branch joining junctions B1 and A2 may contain a resistor R only. Or, more generally, the generators $G(B1, A2)$ in FIG. 6 is to be adjusted to develop a voltage of zero amplitude. It should also have negligible impedance. In like manner for the loop joining A1, A2, B2, in FIG. 6:

$$G(\overset{-}{A}1, \overset{+}{B}2)K=0-0.993+1.001=+0.008$$

Hence the generator $G(A1, B2)$ must have a magnitude of $0.008/K$ volts, and must be poled with its "positive" terminal to the junction B2.

The generators may be of alternating current, as already indicated. In such case, all are of the same frequency and are cophasal.

It is to be noted that the analogue network of FIG. 6 includes three error voltage generators, all energized at once (although generator $G(B1, A2)$ develops, for relaxation of the coordinates of FIG. 4, zero output voltage). The relaxed value of the $x$-coordinates of each of the points 1B, 2B and 2A of FIG. 1 is obtained from the analogue circuit of FIG. 6 by adding to the coordinate of such point in FIG. 4 the correction obtained from the voltage measured in FIG. 6 between such point and the point A1 in FIG. 6.

The voltages of the three generators $G(A1, A2)$, $G(B1, A2)$ and $G(A1, B2)$, whether direct current or alternating current in nature, are superposed in the network of FIG. 6 to distribute according to the least squares relaxation principle the three closure errors which can be found from the data on points A1, B1, B2 and A2 contained in FIG. 3.

It is to be understood that the $x$-coordinate values of these four points in FIG. 3 may be relaxed according to the invention although assumed values of $x$-coordinate for those points are obtained by accumulating the measured $x$-coordinate values of FIG. 3 along another route such as A1, A2, B2, B1 and then back to the A1. The assumed values thus found will be different, the closure errors will be different, and the consequent values of voltage for the error voltage generators will be different. Indeed the first error voltage generator will be located in the branch of the analogue circuit of FIG. 5, or FIG. 6 between junctions A1 and B1 of those figures, and no generator will be in the branch joining A1 and A2. Nevertheless the relaxed coordinate values for the points 1B, 2B and 2A of FIG. 1 thus found will be the same as those found from the circuits of FIG. 5 and FIG. 6.

The procedure for obtaining relaxed values of $y$-coordinates is obviously exactly the same as that which has been described.

In the general case, the invention is concerned with obtaining relaxed values for the coordinates of a larger number of points than the four points (or photograph centers) dealt with in the example of FIGS. 4–6. FIG. 7 shows one of the plural paths along which, from the measured data of FIG. 3, either $x$- or $y$-values of displacement between adjacent points in the matrix of photographs of FIG. 1 can be accumulated to assign assumed values of $x$- or $y$-coordinate to those points for application of the invention. In view of the fact that FIG. 3 gives measured values only for the rows A, B and C and for the columns 1, 2 and 3, assumed values of $x$-coordinates are found in FIG. 7 only for the nine points found simultaneously in those rows and columns. The path by which the assumed x-coordinate values of FIG. 7 are obtained is through the points A1, B1, C1, C2, B2, A2, A3, B3, C3 in that order. It is however possible to trace out from an origin a path through all points in the $x$ rows and $n$ columns of FIG. 1, if data for those points are available.

The assumed values of $x$-coordinate shown in FIG. 7 are obtained in exactly the same way as that explained in connection with FIG. 4. With a set of assumed values as indicated in FIG. 7, the $x$-coordinates (and from a similar set of assumed $y$-coordinate values the y-coordinates likewise) of the nine points of FIG. 7 can be corrected according to the principle of least squares by means of the electric analogue circuit of FIG. 8. In this circuit, there is a junction point for each of the points of FIG. 7, and each such junction point is connected to each of its neighbors along the rows, columns and diagonals of the rectangular array of FIG. 8, by means of a resistor of nominal value R. Three error voltage generators G are provided in the circuit for each set of four rectangularly disposed junction points, one in a row (or column) branch adjacent that point, and one in each of the two diagonal branches adjacent thereto.

The magnitudes and polarities of the voltages to be developed by those generators are determined by the process which has been explained in connection with FIGS. 4–6. Between each pair of points which are adjacent each other along a row, a column, or a diagonal of the array of FIG. 7, the difference between the assumed values for the points of such pair is compared with the measured separation of the points of such pair and an error voltage generator is energized in the branch joining the points of such pair, with a voltage of magnitude and polarity as specified by Equation 3. Evidently, unless, contrary to the showing of FIG. 8, provision for an error voltage generator is to be made in every branch of the circuit of that figure, it is desirable that the paths by which the assumed values are assigned be along the columns if the generators (other than those in the diagonal branches) are provided in branches in the rows, and vice versa. It is apparent from inspection of FIG. 7 that in FIG. 8, when set up according to the assumed values of FIG. 7, the generators $G(C1, C2)$ and $G(A2, A3)$ in FIG. 8 will be adjusted to produce zero output. Of course it would be possible to assign values to the points of FIG. 7 by traveling along diagonal paths, but in such case for maximum relaxation of coordinate values by means of error voltage generators between adjacent matrix points it would be necessary to introduce such generators into certain branches along both rows and columns, whereas error voltage generators would not be used along the diagonals followed in assigning the assumed values.

When, for any reason, the table of data of FIG. 3 is incomplete as to any particular $\Delta x$ (or $\Delta y$) spacing, the corresponding branch in the analogue such as that of FIG. 8 is open circuited.

FIG. 8 illustrates a further feature of the invention, by means of which the measured data of FIG. 3 may be further corrected in accordance with the data on the position of additional landmarks of known geographical position. These landmarks are herein referred to as "check points."

Referring to FIG. 1, let $t_3$, lying within the territory embraced by photograph 1A, be a well defined landmark, the location of which is latitude and longitude or other applicable grid of geographical coordinates is well known, so that it may form a reference point from which the geographical coordinates of the center of photograph 1A may be accurately measured. Further let $t_4$ and $t_5$, respectively, within the partly overlapping horizontally and vertically matched quadrilateral territories embraced respectively by photographs 2A, 2B, 3A and 3B and by photographs 2B, 2C, 3B and 3C be two additional well-defined landmarks, of accurately known coordinates.

The landmarks $t_3$, $t_4$ and $t_5$ may be used as check points in the invention, i.e. as locations with respect to which the errors in the measured values of the spacings of the photographs of the set may, separately as to each coordinate, be further redistributed throughout the complete set of measurements, again on a least square relaxed basis.

The correction or redistribution of the closure errors which appear in the data of FIG. 3 on the location of the photographs considered as a set may be said to make that data self-consistent. In other words, with the closure errors found upon traversing closed paths redistributed as hereinabove discussed with reference to FIGS. 4–8, the set of photographs and the corrected data on their relative spacings, in two coordinates, represents a physically realizable model of a portion of the earth's surface.

A model so constructed will not however exactly fit or correspond to the portion of the earth's surface depicted in the photographs, and the fit can be improved by the introduction into the data measured from the photographs of additional corrections based upon the use of check points, again via the electric error analogue of the invention.

The use of check points in accordance with the invention may be explained as follows.

Consider the $x$-coordinate, say. In the first place a check point generator GC is advantageously connected, in series with a resistor R, between the matrix point A1 and a unipotential surface, indicated as ground, which represents the $x$-coordinate of the reference point $t_3$. This generator is adjusted to develop a voltage proportioned, in magnitude and polarity, to the discrepancy between the measured separation (along the $x$-coordinate) of the known position of $t_3$ and the center of photograph 1A, on the one hand, and the difference between the known $x$-coordinate of $t_3$ and the assumed $x$-coordinate of A1 on the other hand.

For a check point such as $t_4$ there can be measured, on each of the four (or more, or less) photographs of FIG. 1 on which the check point appears, the distance from the check point to the center of the photograph. Consider the measured distance along $x$, from $t_4$ to the center of photograph 2A. This measured distance will in general not coincide with the difference in $x$-coordinate between the known $x$-coordinate of $t_4$ and the assumed $x$-coordinate of matrix point A2. Accordingly a check point generator GC is connected, in series with a resistor R between ground and matrix point A2, the generator being adjusted to develop a voltage proportional, in magnitude and size, to this last-named difference.

If the discrepancy is of zero magnitude, the check point generator is of course adjusted for zero output. The check point generator is of the same frequency as the matrix generators already discussed, and the conventions which have been discussed with respect to signs apply thereto also.

Advantageously a check point such as $t_4$ or $t_5$ in FIG. 1 is used, with a separate check point generator GC and resistor R, for coordinate relaxation via two or more junctions in the electric analogue matrix—for example the four junctions representing the centers of four of the photographs of FIG. 1 on which the check point appears. These may be selected as the photographs to whose centers the check point is nearest. A check point may however be connected via check point generators and resistors R to more than four matrix junctions.

Check points may also be used, according to the invention, even when their exact location is not known, and the invention affords means of estimating the effect, on the coordinates of the various photographs of the set, of uncertainties in the coordinates of landmarks desired to be used as check points. According to this feature of the invention the electric analogue of the check point is not short-circuited to the analogue reference junction but is connected thereto instead through a voltage generator of distinct frequency, termed an uncertainty generator.

Consider the check point $t_5$ in FIG. 1 and let the $x$-coordinate of its position be supposed to be known to an uncertainty of $\pm\delta x$. In the analogue circuit of FIG. 8 there is shown an electrical junction point $T_5$, connected to each of the matrix junctions B2, C2, C3, B3 via a check point generator GC and via a resistor R, and further connected to ground through an uncertainty generator GU. The output of the check point generators GC connected to $T_5$ are dimensioned in accordance with the principles above discussed, the computation departing from the most probable or likely value of the $x$-coordinate of point $t_5$. The generator GU is adjusted to develop an output voltage related to $\delta x$ by the same relation of distance to voltage as that used on all of the generators G and GC of FIG. 8, but at a distinct frequency so that the effect of the uncertainty can be separately estimated. If still other check points are employed, each should preferably have an uncertainty generator of separate frequency used therewith.

The corrections to the assumed coordinate values developed by the matrix circuit of FIG. 8 are read by means of a voltmeter. FIG. 8 shows a voltmeter $VM_1$, connected in series with a filter $F_0$ which passes only voltage of the frequency of the matrix generators G and check point generators GC. This meter and filter circuit is connected between ground and a flexible conductor which can be connected to any one of the matrix junctions, by the provision at those junctions of a telephone jack, for example. The meter is of phase sensitive type, and is desirably provided to read digitally in increments of $x$ or $y$-coordinate, a minus sign being exhibited when the correction is negative. For such phase indication the meter must of course be fed with the reference voltage with which the voltages of generators G and GC are cophasal. Phase detectors are however well known, and a detailed showing of a circuit for this purpose is believed unnecessary.

For reading the effect of uncertainties in the known values of the check point location a separate voltmeter $VM_2$ may be provided, also phase sensitive and digital in presentation. Meter $VM_2$ is advantageously designed to respond to the frequencies of all uncertainty generators, but may be made responsive to them individually, by means of a plurality of band pass filters $F_1$, $F_2$, etc. which pass the frequencies of the uncertainty generators individually. In addition, a filter $F_k$ may be provided, broad enough to pass the outputs of all uncertainty generators, if the collective effect of the uncertainties in check point positions is desired to be measured.

Selection among the filters $F_1, F_2 \ldots F_k$ is made by means of a switch SW. The terminals of the filters opposite the switch may connect with separate patch cord conductors, or with the same conductor which leads to filter $F_0$.

A preferred form of electric analogue circuit according to the invention including auxiliary elements whereby the error voltages may be entered in the proper values and in an organized manner, and including certain other features of the invention presently to be described, is shown schematically in FIG. 9. In FIG. 9 there is generally indicated at 40 an electric matrix network comprising $n$ columns and X rows of electric junction points.

Each of the $n$X points or junctions is connected with its immediate neighbors in the rows and columns of the matrix by a resistor R, the connection from each point downwardly along the columns and downwardly along the diagonals further including the secondary winding 41 of a transformer 43 for the insertion of a voltage into the matrix branch containing such winding. These windings 41 function as error voltage generators in the embodiment of FIG. 9. Their location in the columns of matrix 40 instead of the rows thereof presupposes that the path employed for assignment of assumed values in the corresponding set of photographs will be along the rows instead of along the columns, e.g., for the nine points of a small array such as is shown in FIGS. 7 and 8, along a path such as A1, A2, A3, B3, B2, B1, C1, C2, C3.

The branches containing windings 41, and more particularly the generators which these windings constitute therein, are individually identified in the figure by a three symbol code. The first two symbols identify the matrix junction point downwardly from which extends the branch in question and the last symbol is the number 1, 2, or 3, according as the branch is in a column, in a diagonal extending downwardly to the left or in a diagonal extending downwardly to the right. Other conventions may of course be adopted instead.

For clarity the windings are not shown in the matrix 40 itself. Instead the branches which contain these windings are indicated as being opened, the identification of the branch being indicated at the opening. Beneath the matrix there is shown a plurality of transformers 43, the secondary windings 41 of which are labeled with the matrix branches into which they are connected. Each of these transformers is fed from a source of alternating current power applied between two conductors 42 and 44. This source of power may for example be single phase power at 60 cycles and 230 volts R.M.S. For each of the matrix generators 1A1, 1A3, etc. as they may be termed there is connected between the two conductors 42 and 44 a potentiometer resistor 46, and the primary winding of each transformer is connected between a midtap on its resistor 46 and a movable tap which can be adjusted to positions on either side of the midtap so as to provide in the transformer secondary a voltage of either sense by reference to the sense of the voltage between conductors 42 and 44.

There is included in series with the secondary transformer winding of each of the matrix generators 41 (and hence in series with the matrix branches in which the secondary windings are connected) a switch 48 by means of which such branches may be opened. If the table of FIG. 3 lacks, in the coordinate for which the analogue of FIG. 9 is being set up, the measured separation of the photograph centers of which the junctions at the end of a branch are the analogues, the switch 48 in such branch is opened. The switch 48 may advantageously be mechanically linked with the movable tap on potentiometer 46 so that at one extreme position for that tap the switch is opened, the switch being closed for all other positions of the tap.

Matrix generators 41, and hence transformers 43, are provided in a number dependent upon the numbers of rows and columns in the matrix. With measured values for the separation of each matrix point in FIG. 3 from each of its immediate neighbors along the rows, columns and diagonals of that matrix or array, there exist a total of three independent closed paths within each quadrangular cell or element. Consequently there are provided three matrix generators for each element of the matrix 40 in FIG. 9. Along the edges of the matrix, however, in particular those defined by the extreme columns thereof, the outwardly directed diagonal branches are missing. Consequently for a matrix comprising $n$ columns and X rows, the desired number N of matrix generators is given by the expression $$N=[(n-2)3+4](X-1)$$

All of these matrix generators are connected across the same power line provided by conductors 42 and 44. Only a few are shown in FIG. 9, conductors 42 and 44 being shown broken to indicate the existence of the others.

The apparatus of FIG. 9 further includes additional voltage generators energized from conductors 42, 44 which can be connected into the matrix between one or more junction points therein and a point of fixed potential such as a ground, to which the matrix itself is connected at one of its junction points—point 1A in FIG. 5. These additional generators are indicated at reference characters 51 in FIG. 9, applied to the secondary windings of a plurality of transformers 53. These generators, with the transformers 53 to which they belong and the connection of those transformers to the power line 42, 44, may be identical with the generators 41 already described with the exception that the output voltages across the secondary windings 51 of transformers 53 are connected between ground (either directly or through an uncertainty generator 54) and a jack 55 in each case from which connection may be made, by means of a patch cord (not shown), which cord includes a resistor R, and any of the matrix points 1A, 2B, . . . $n$X in FIG. 9.

The generators 51 may be referred to as check point generators. In FIG. 9, two sets of four check point generators 51 are shown, one set operating in conjunction with an uncertainty generator 54 and the other in connection with another uncertainty generator 54′ of different frequency.

In order to insert into the matrix 40 error voltages of proper magnitude by means of the generators 41 and 51 (the latter only in case check points are used) and in order to do so in an organized manner, the apparatus of FIG. 9 includes a three-deck multiple contact switch generally indicated at 60. Switch 60 is advantageously constructed as a stepping switch having three banks 62, 64 and 66 of stationary contacts, with which are associated rotating contact arms 63, 65 and 67 respectively. The number of stationary contacts is given by the quantity $N+nX$ plus four times the number of check points for which provision is made—two in the case illustrated. Associated with the stepping switch 60 there is provided a voltmeter 68. Meter 68 connects with the second and third banks 64 and 66 of stepping switch 60 via conductors 70 and 72.

The first N stationary contacts in banks 64 and 66 are connected in pairs including one contact from each bank, and by conductors not shown, across the N matrix generators 41 so that in these positions the meter 68 will read the voltage applied by those generators to the matrix 40. This connection is made to permit adjustment of the matrix generators, at the potentiometers 46 thereof, to the values necessary for introduction of the proper voltages into the matrix.

The next group of stationary contacts on the stepping switch is used to connect the meter 68 successively across the check point generators 51. In the example illustrated, two sets of four such generators are provided, so that 2×4 stationary contacts are included in this group. For the measurement of these check point generator voltages the meter input conductor 70 leading to the rotating arm of the third bank 66 is connected, through the $N+1$st to the $N+8$th fixed contacts of that bank, to ground in view of the connection of one side of the secondary windings in transformers 53 to ground through the uncertainty generators 54 and 54′. The corresponding contacts in the second bank 64 are connected directly, by conductors not shown, to the ungrounded terminals of the secondary windings of transformers 53.

The last $n$X positions in the stepping switch are provided for measurement at meter 68 of the relaxed errors at the junction points of the matrix 40 after introduction therein of appropriate closure error, check point and uncertainty voltages by means of the generators 41, 51 and 54, 54′. Since these relaxed error voltages are measured between the matrix points and a point of fixed potential to which the matrix is connected at one of its points, the geographical coordinates of which are accurately known (A1 in FIG. 9), the last $n$X fixed contacts in bank 66 are connected to ground in order to ground the meter input conductor 70. The last $n$X stationary contacts of the secondary bank 64 are connected, by conductors not shown, to the matrix junction points A1, B2, . . . X$n$.

The first bank of contacts in switch 60 is arranged to energize a series of pilot lamps 70, one for each of the switch positions. These may be physically arranged for the convenience of the operators of the equipment, for example by locating the pilot lamps for the first N positions of switch 60 adjacent the mechanical controls (not shown) which operate the potentiometers 46 of the respective matrix generators 41. The same arrangement may be provided with respect to the pilot lamps for the check point generators 51. The pilot lamps associated via the stepping switch with the measurement of relaxed error voltages in the matrix may be disposed in any desired manner, for example in an array geometrically resembling the matrix itself as schematically shown in FIG. 9.

The meter 68 receives at conductors 42 and 44 the voltage from which the matrix error and check point voltages are derived in order to permit discrimination as to the phase of the voltages measured. Conductors 74 and 76 deliver to the meter the outputs of uncertainty voltage generators 54 and 54′ respectively for their proper initial adjustment. A selector control 80 connects the meter input channel either to conductors 70 and 72, or to one of the conductors 74 and 76 on the one hand and ground on the other. A frequency selector 82 inserts into the meter input channels, within the meter, one of a number of bandpass filters, one passing the frequency of the generators 41 and 51, another the frequency of generator 54, a third the frequency of generator 54′, and still another passing all of these frequencies.

The operating procedure for determinating the least square relaxed coordinate errors in the data of FIG. 3 is to introduce into the matrix 40 of FIG. 9 by means of the generators 41 error voltages of proper magnitude. If the measured data for a particular branch is unavailable, the potentiometer 46 for the branch in question is shifted to the extreme position in which the switch 48 of its matrix generator is opened. If no check points are available the operator proceeds directly to measure the relaxed error voltages at the last $n$X position of the stepping switch. If check point data is available, error voltages representative thereof, with or without a series connected uncertainty voltage as appropriate, are first introduced in accordance with the procedure which has been described.

We claim:

1. The method of correcting a plurality of data with respect to the difference between their sum and a datum representative of that sum which comprises connecting into a series circuit a plurality of substantially equal resistors equal in number to said first-mentioned plurality, connecting across said circuit a series combination of a further resistor of said value and a generator having an output voltage proportioned to said difference, and measuring the voltages from the junctions in said circuit to one end of said circuit.

2. The method of effecting a least squares relaxation of the errors in a plurality of measured data as represented by the difference between their sum and a datum representative of that sum which comprises connecting into a series circuit a plurality of substantially equal resistors equal in number to said first-mentioned plurality and connecting across said circuit a series combination of a further resistor of said value and a genator having an output voltage proportioned to said difference.

3. The method of effecting a least squares relaxation of the closure errors in data measured, along one of two linear coordinates, on the relative position of the members of a set of partially overlapping topographical photographs which comprises introducing into a closed loop circuit of nominally equal-valued resistors a source of voltage proportional in magnitude and sign to the closure error existing in said data for a closed path including as many displacements as there are resistors in said circuit, and measuring the voltage from the junctions of adjacent of said resistors to a selected one of said junctions.

4. An electric analogue network comprising a plurality of substantially equal-valued resistors connected into the branches of a matrix of conductors disposed along rows and columns, said conductors being interconnected at the junctions of said rows and columns, means to insert an electric generator into at least one branch of each quadrangular cell of said matrix, and means to measure the voltage from each of said junctions to one of said junctions.

5. An electric analogue network comprising a plurality of electric junction points interconnectible by conducting branch means into a matrix of rows and columns, a resistor in each of said branches, said resistors being all of substantially the same value, means to introduce a voltage into selected ones of said branches, and means to measure the voltage from each of said junction points to one of said junction points.

6. An electric analogue network comprising a plurality of electric junction points interconnectible by conducting branches into a matrix of rows, columns and diagonals, said network including a resistor between each of said junctions and every junction adjacent such junction along said rows, columns and diagonals, said resistors being of substantially the same value, adjustable means to introduce an alternating current voltage into selected ones of said branches, and means to measure the voltage between any of said junction points and a selected one of said junction points.

7. An electric analogue network comprising a plurality of substantially equal-valued resistors connected into a matrix having an electric junction at each end of each of said resistors, each such junction connecting to one end of each of eight of said resistors disposed in pairs in a row, a column and two diagonals of said matrix, a source of alternating current voltage of a first frequency, a plurality of variable transformers energized from said source, the secondary windings of said transformers being connected each in series with one of said resistors, and means to measure the voltage from each of said junctions to one of said junctions.

8. An electric analogue network comprising a plurality of substantially equal-valued resistors connected into a matrix having an electric junction at each end of each of said resistors, each such junction connecting to one end of each of eight of said resistors disposed in pairs in a row, a column and two diagonals of said matrix, a source of alternating current voltage of a first frequency, a first plurality of variable transformers energized from said source, the secondary windings of said transformers being connected each in series with one of said resistors, a second plurality of variable transformers energized from said source, means to connect the secondary winding of each of the transformers of said second plurality in series with a resistor substantially of said value between a selected one of said junctions and another of said junctions, and means to measure the voltage from each of said junctions to one of said junctions.

9. Apparatus for effecting a least squares relaxation of errors in data measured along either of two linear coordinates in the relative positions of the members of a set of topographical photographs arranged in rows and columns, said apparatus comprising an array of electrical junction points disposed in rows and columns, said array including a junction point for each photograph in said set, a resistor connected between each pair of points disposed in said array along the rows and columns thereof, a plurality of voltage sources adjustable in magnitude and polarity, means to connect, in each of an equal plurality of the cells of said array comprising four of said junction points in a quadrilateral, a separate one of said sources in series with the resistor between correspondingly positioned pairs of said junction points, all of said resistors having substantially the same resistance, and means to measure the voltage from each of said junction points to one of said junction points.

10. Apparatus for effecting a least squares relaxation of the errors in data measured along either of two linear coordinates in the relative positions of the members of a set of topographical photographs partially overlapping each other along rows and columns, said apparatus comprising an array of electrical junction points arranged in rows and columns, said array including one junction point for each of said photographs, a resistor connected between each pair of adjacent points disposed in said array along the rows, columns and diagonals thereof to form a multiplicity of circuit branches electrically interconnecting adjacent of said points, a plurality of alternating current voltage sources of the same frequency, of common phase and of adjustable amplitude and reversible phase polarity, means to connect, in each of a plurality of said branches, one of said sources in series with the resistor in such branch, said last-named plurality including one branch for each four-branch quadrilateral of said array disposed along rows and columns thereof, all of said resistors having substantially the same resistance, and means to measure the voltage from each of said junction points to one of said junction points.

11. Apparatus for effecting a least squares relaxation of the errors in data measured along either of two linear coordinates in the relative positions of the members of a set of topographical photographs partially overlapping each other along rows and columns, said apparatus comprising an array of electrical junction points arranged in rows and columns, said array including one junction point for each of said photographs, a resistor connected between each pair of adjacent points disposed in said array along the rows, columns and diagonals thereof to form a multiplicity of circuit branches electrically interconnecting adjacent of said points, a plurality of alternating current voltage sources of the same frequency, of common phase and of adjustable amplitude and reversible phase polarity, means to connect, in each of a plurality of said branches, one of said sources in series with the resistor in such branch, said second-mentioned plurality including three branches for each four-branch quadrilateral of said array disposed along rows and columns thereof, and means to measure the voltage from each of said junction points to one of said junction points.

12. Apparatus for effecting a least squares relaxation of the errors in data measured along either of two linear coordinates in the relative positions of the members of a set of topographical photographs partially overlapping each other along rows and columns, said apparatus comprising an array of electrical junction points arranged in rows and columns, said array including one junction point for each of said photographs, a resistor connected between each pair of adjacent points disposed in said array along the rows, columns and diagonals thereof to form a multiplicity of circuit branches electrically interconnecting adjacent of said points, a plurality of alternating current voltage sources of the same frequency, of common phase and of adjustable amplitude and reversible phase polarity, means to connect, in each of a plurality of said branches, one of said sources in series with the resistor in such branch, said second-mentioned plurality including three branches for each four-branch quadrilateral of said array disposed along rows and columns thereof, and means to connect additional of said sources each in series with a resistor between one of said junction points and separate other ones of said junction points, all of said resistors having substantially the same resistance, and means to measure the voltage from each of said junction points to one of said junction points.

13. Apparatus for effecting a least squares relaxation of the errors in data measured along either of two linear coordinates in the relative positions of the members of a set of topographical photographs partially overlapping each other along rows and columns, said apparatus comprising an array of electrical junction points arranged in rows and columns, said array including one junction point for each of said photographs, a resistor connected between each pair of adjacent points disposed in said array along the rows, columns and diagonals thereof to form a multiplicity of circuit branches electrically interconnecting adjacent of said points, a plurality of alternating current voltage sources of the same frequency, of common phase and of adjustable amplitude and reversible phase polarity, means to connect, in each of a plurality of said branches, one of said sources in series with the resistor in such branch, a source of alternating current voltage of different frequency and of adjustable amplitude, means to connect additional of said first-named sources each in series with said last-named source and with a resistor between a common one of said junction points and a distinct one of said junction points, all of said resistors having substantially the same resistance, and means to measure the voltage from each of said junction points to one of said junction points.

14. The method of effecting a least squares relaxation of the errors in the measurement of the successive separations of a plurality of points which comprises connecting into a series circuit substantially equal valued resistors of the same number as the number of said separations, and connecting across said circuit the series combination of a resistor of said value and a voltage proportional to the difference between the sum of said separations and the separation between the first and last points of said plurality.

15. The method of effecting a least squares relaxation of the closure error in the measurement of the component, along a common coordinate, of a plurality of displacements extending from a starting point and returning thereto which comprises inserting into a loop circuit containing substantially equal-valued resistors of the same number as said plurality a source of voltage proportional to the sum of said displacements, and measuring the voltages from the junctions of said resistors to one terminal of said source.

References Cited in the file of this patent

UNITED STATES PATENTS 2,734,682 Mayes ---------------- Feb. 14, 1956

OTHER REFERENCES

Transactions, American Geophysical Union (Speert), December 1947, pages 831–837. (Copy in Div. 23 and Scientific Library.)

Geophysics (Cowles), vol. 3, No. 4, pages 332–339, 1938. (Copy in Div. 42.)